United States Patent
Tanaka

[11] Patent Number: 5,357,531
[45] Date of Patent: Oct. 18, 1994

[54] MULTIFRAME CHANNEL PARITY COUNTER

[75] Inventor: Hiroyuki Tanaka, Tokyo, Japan

[73] Assignee: NEC Corporation, Japan

[21] Appl. No.: 185,312

[22] Filed: Jan. 21, 1994

Related U.S. Application Data

[63] Continuation of Ser. No. 634,074, Dec. 26, 1990, abandoned.

[30] Foreign Application Priority Data

Dec. 27, 1989 [JP] Japan .................. 1-339116

[51] Int. Cl.5 ........................... G06F 11/10
[52] U.S. Cl. ..................... 371/49.1; 371/49.2
[58] Field of Search ............. 371/49.1, 49.2, 50.1, 371/51.1, 54, 38.1, 37.1, 40.1, 25.1, 48; 364/716, 718

[56] References Cited

U.S. PATENT DOCUMENTS

| | | | |
|---|---|---|---|
| 4,375,100 | 2/1983 | Tsuji et al. | 371/38.1 |
| 4,447,902 | 5/1984 | Wilkinson | 371/39 |
| 4,586,183 | 4/1986 | Wilkinson | 371/38.1 |
| 4,916,701 | 4/1990 | Eggenberger et al. | 371/37.7 |

*Primary Examiner*—Robert W. Beausoliel, Jr.
*Assistant Examiner*—Phung My Chung
*Attorney, Agent, or Firm*—Ostrolenk, Faber, Gerb & Soffen

[57] ABSTRACT

In a parity counter for a multiframe signal, parity bits are successively derived from corresponding channels of successive frames and successively modulo-2 summed with those of corresponding channels to generate multiframe channel parity bits, which are delivered to a buffer memory. In the parity counter is used at the transmit end of a TDM communications system, the contents of the buffer memory are successively multiplexed with different frames of a subsequent multiframe. If the parity counter is used at the receive end of the system, the contents of the buffer memory are compared with multiframe channel parity bits received on a subsequent multiframe signal.

7 Claims, 4 Drawing Sheets

MULTIFRAME CHANNEL PARITY COUNTER

This is a continuation of application Ser. No. 07/634,074 filed on Dec. 26, 1990, now abandoned.

BACKGROUND OF THE INVENTION

The present invention relates generally to multiframe TDM (time division multiplex) communication systems, and more specifically to parity check error detection for multiframe TDM data.

With current TDM digital transmission systems, a parity bit is derived from data bits of each channel of a frame by counting binary 1's such that if there is an odd (or even) number of binary 1's in the channel, the parity bit is a 1, and if there is an even (or odd) number of 1's in that channel, the parity bit is a 0. As many times slots, or parity check fields are reserved in each frame as there are channels in it. The parity bits derived from all channels of the frame are inserted respectively to the parity check fields and transmitted. At a receiving end, a parity bit is derived from the received data bits of each channel and compared with the transmitted parity bit of the corresponding channel to detect an error in that channel is there is a mismatch between them.

However, to meet the increasing volume of information being transmitted with a reduced overhead, it is desirable to perform parity check on a per multiframe basis, rather than on a per frame basis.

SUMMARY OF THE INVENTION

It is therefore an object of the present invention to provide a parity check counter which generates multiframe channel parity bits to enable parity check to be performed on a per multiframe basis, rather than on a per frame basis.

The object of the present invention is obtained by successively deriving parity bits from data bits of each channel, modulo-2 summing the parity bits of the same channels of successive frames, and generating multiframe channel parity bits when all parity bits are modulo-2 summed.

According to the present invention, there is provided a method for deriving parity bits from a multiframe signal which comprises a plurality of frames each containing N-bit channels. According to this method, a parity bit is derived from each channel of each frame and stored into a successive location of a memory. Parity bits are successive derived from the channels of a subsequent frame and modulo-2 summed with the parity bits in memory derived from the channels of a preceding frame corresponding to those of the subsequent frame. The stored parity bits are replaced with the modulo-2 summed parity bits. The process is repeated until the parity bits of all frames of the multiframe are modulo-2 summed. The modulo-2 summed parity bits obtained at the end of the process are stored into a buffer memory from which they are read out and multiplexed with a subsequent multiframe.

According to the present invention, a parity counter is provided which is adapted to receive a multiframe signal comprising a plurality of frames each containing a plurality of N-bit channels. The counter includes a parity bit generator for deriving a parity bit from each of the channels of each frame. A read/write controller controls a memory to store the parity bits derived from the frame of first occurrence in the multiframe signal and operates the memory in read and write modes during each of the remainder frames of the multiframe signal. A modulo-2 adder circuit is provided for modulo-2 summing the parity bits from the parity bit generator with corresponding parity bits supplied from the memory during a read mode and supplying the modulo-2 summed parity bits to the memory during a write mode so that the stored parity bits are replaced with the modulo-2 summed parity bits. The output of the modulo-2 adder circuit is gated to a buffer memory when the parity bits derived from all the frames of the multiframe signal are modulo-2 summed.

BRIEF DESCRIPTION OF THE DRAWINGS

The present invention will be described in further detail with reference to the accompanying drawings, in which.

DETAILED DESCRIPTION

Figure 1:
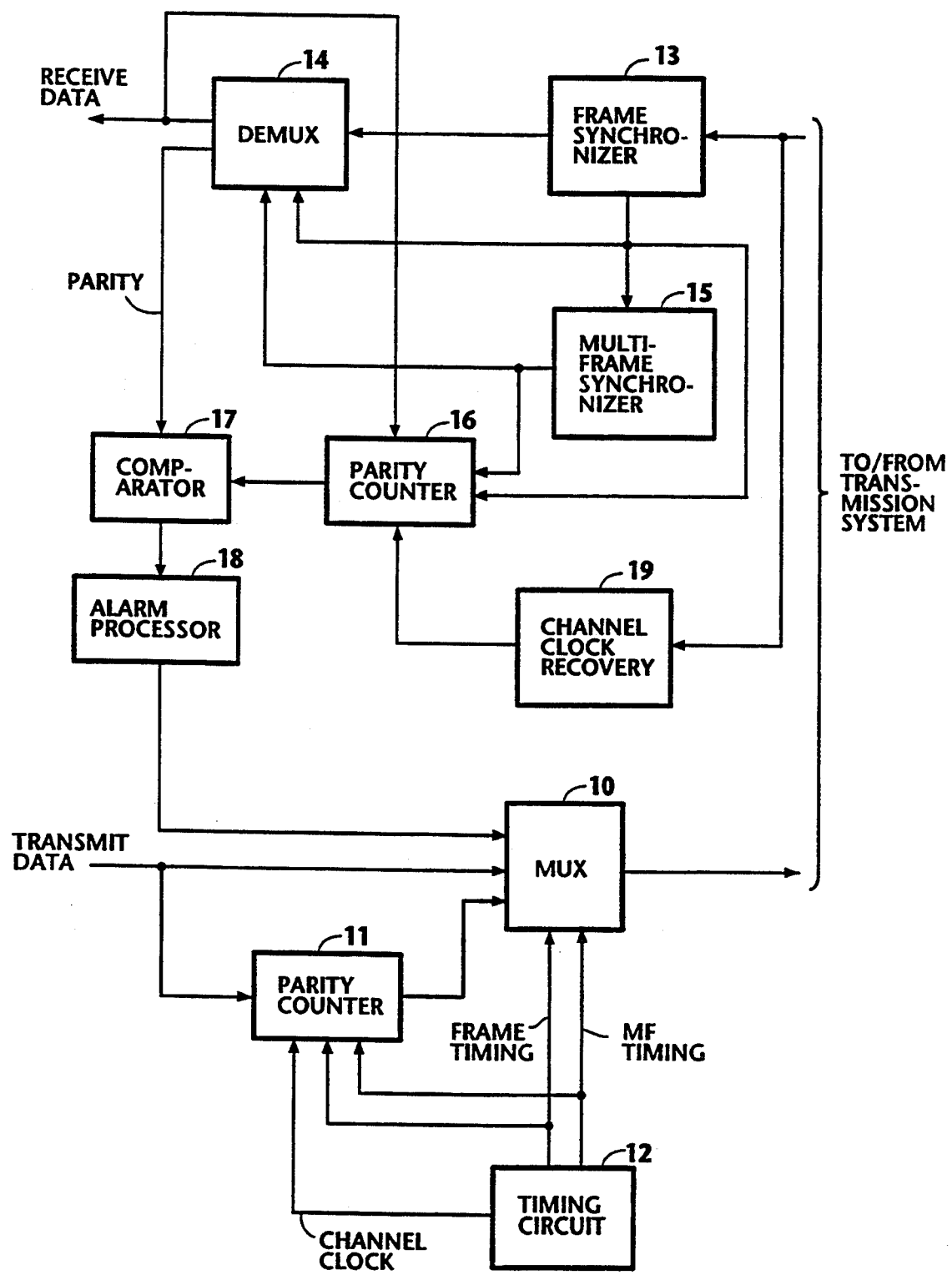
FIG. 1 shows in block form a time-division multiplex (TDM) communication system incorporating multiframe channel parity check circuits of the present invention.

Referring now to FIG. 1, there is shown a TDM communications system incorporating the parity checkers of the present invention. A transmit multiframe TDM input signal is applied to a multiplexer 10 where it is multiplexed with parity bits generated by a transmit parity counter 11 and a signal from an alarm process 18 and sent through a suitable transmission facility to the distant end of the communications systems. Frame and multiframe timing signals and channel clock are generated by a timing circuit 12 for purposes of multiplexing signals and generating parity bits. The channel clock pulse is generated in synchronism with the channel or time slot of the frame. Each channel contains N bits of data and so there is one channel clock from every N data bits.

Multiframe TDM incoming signal from the distant end is received by a frame synchronizer 13 by which frame sync timing is extracted from the received signal, the received TDM signal being applied to a demultiplexer 14 where it is decomposed into data bits and parity bits. A multiframe synchronizer 15 is provided to extract multiframe sync timing from the frame timing to control the demultiplexer 14 and a receive parity counter 16 which is coupled to frame synchronizer 13. Receive parity counter 16 generates a parity bit from the data bits of each channel supplied from demultiplexer 14. Parity bits contained in the received signal are compared by a comparitor 7 with the parity bits generated by parity counter 16. If they mismatch, comparator 17 notifies this fact through alarm processor 18 to send a retransmit request to the distant end, specifying the channel in which an error has occurred during transmission of a multiframe. A channel clock recovery circuit 19 is provided to recover the channel clock timing for parity counter 16 from the received signal.

Figure 3:
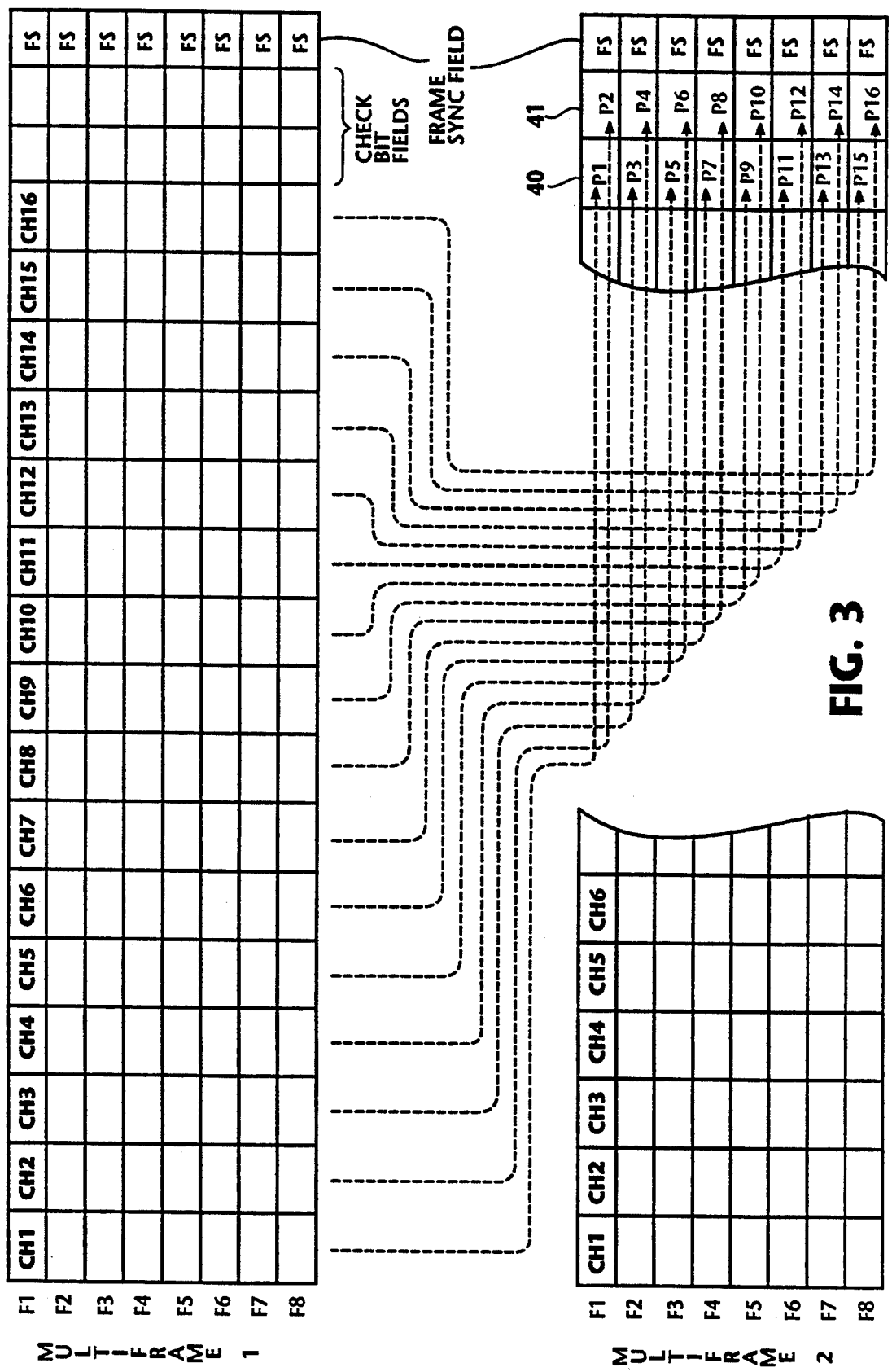
FIG. 3 shows the multiframe data structure of the present invention in which modulo-2 summed parity bits are shown divided into groups and multiplexed into frames of a subsequent multiframe signal.

The multiframe data structure employed in the system comprises K frames of M channels each having N data bits. For purposes of illustration, each frame comprises 16 N-bit channels, or time slots followed by two parity fields and a frame sync field and each multiframe comprises 8 frames as illustrated in FIG. 3.

Figure 2:
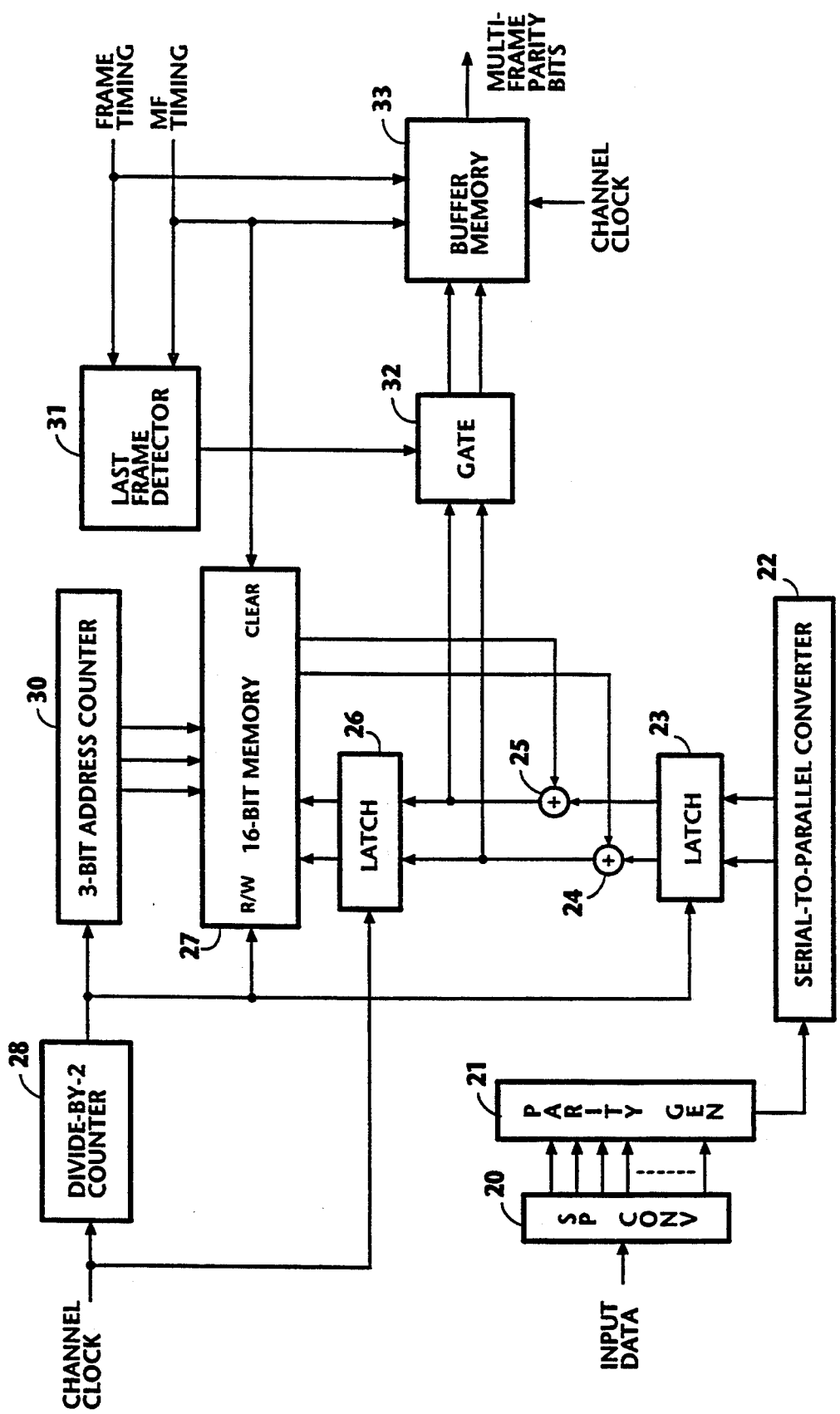
FIG. 2 shows details of a parity counter according to one embodiment of the present invention.

The transmit and receive parity counters are of identical construction. As shown in FIG. 2, the parity counter comprises a serial-to-parallel converter 20 in which the transmit data or output of frame synchronizer 13 is converted to parallel form at channel intervals. A parity generator 21 is coupled to the outputs of serial-to-parallel converter 20 to generate a parity bit (odd or even) for every N data bits of each channel and supplies it to a serial-to-parallel converter 22, in which the parity bits of two successive channels are arranged in parallel form and fed into a latch 23.

A divide-by-2 counter 28 is driven by channel clock supplied from timing circuit 12 or channel clock recovery circuit 19 to produce an output pulse for every two channel intervals. The output of counter 28 is applied to latch 23 to store the parity bits for coupling to the first inputs of modulo-2 adders 24 and 25, respectively. The outputs of the modulo-2 adders are coupled through a latch 26 to the write inputs of a 16-bit memory 27, whose read/write mode timing is controlled by the output of divide-by-2 counter 28. Latch 26 is clocked by the channel clock pulse to store the outputs of modulo-2 adders 24, 25 for a duration of a channel interval. The output of divide-by-2 counter 28 is further applied to a 3-bit address counter 30 to specify one of eight 2-bit storage locations of the memory. The read outputs of memory 27 are applied to the second inputs of modulo-2 adders 24 and 25, respectively. A last frame detector 31 is provided for detecting the last frame of each multiframe signal. When it detects a last frame, it supplies a gate-open signal to a gate 32 to pass the outputs of modulo-2 adders 24 and 25 to a buffer memory 33. Buffer memory 33 is supplied with multiframe and frame timing pulses as well as channel clock timing pulses to forward the stored parity bits at appropriate timing to multiplexer 10 or comparator 17.

During a first half period of each address cycle of counter 30, the address location of memory 27 is accessed in a read mode and during the second half period the address location is accessed in a write mode. During the read mode of memory 27 the stored contents of the accessed location are modulo-2 summed with outputs of latch 23 by adders 24, 25 and stored into latch 26, and during the write mode of memory 27, the stored contents of latch 26 are written into the address location of the memory.

The operation of the parity counter of FIG. 2 will be understood with description given below with reference to FIG. 3.

Assume that the parity counter is operating as a transmit parity counter 11 and that the odd-parity algorithm is employed in the system. When the beginning of frame #1 of multiframe #1 appears at the input of serial-to-parallel converter 20, memory 27 is cleared by a multiframe timing signal from timing circuit 12. At the beginning of each frame, memory 27 is switched to a read mode in response to the output of counter 28. Input data bits are arranged in parallel form by converter 20 and supplied to parity generator 21 in which binary 1's are counted to produce a parity bit 1 if there is an odd number of binary 1's. First two parity bits are derived from channels #1 and #2 of frame #1 in sequence and fed into serial-to-parallel converter 22 and supplied to latch 23.

The first two parity bits stored in latch 23 are supplied to modulo-2 adders 24 and 25 in response to the output of counter 28 simultaneously with the read operation of memory 27. Since memory 27 has just been cleared, modulo-2 adders 24 and 25 produce the same parity bits as those received from latch 23. Memory 27 is subsequently switched to a write mode to store the first two parity bits into a first 2-bit storage location specified by address counter 30. In like manner, parity bits are derived sequentially from channels #3 and #4 and stored into a second 2-bit storage location of memory 27 specified by address counter 30 in response to a second output from divide-by-2 counter 28. Continuing in this manner, parity bits are sequentially derived in pairs from channels #5 to #16 and fed into third to eighth 2-bit storage locations of the memory, respectively.

When frame #2 of multiframe #1 arrives, parity bits are first read out of the first 2-bit storage location of memory 27 and respectively applied to modulo-2 adders 24 and 25. Concurrently, new parity bits are derived from channels #1 and #2 of frame #2 and supplied to modulo-2 adders 24 and 25, respectively, and modulo-2 summed with the parity bits just read out of memory 27, the results of the modulo-2 summations being stored into latch 26. Memory 27 is subsequently switched to a write mode to store the outputs of latch 26 into the first storage location, overwriting its contents. Since the modulo-2 adder is an exclusive-OR gate which produces a binary 1 if the inputs differs from each other, the output of each modulo-2 adder represents the combined parity bit of the same channels of successive frames. In like manner, stored parity bits of frame #1 are then read out of the second 2-bit storage location of memory 27 and modulo-2 summed with new parity bits derived from channels #3 and #4 of frame #2. The results of the modulo-2 summations are stored into the second 2-bit storage location of the memory, overwriting its contents. Continuing in this way until the end of frame #2, modulo-2 summed parity bits are sequentially derived in pairs from channels #5 to #16 of frame #1 and corresponding channels of frame #2 and stored in the third to eighth 2-bit storage locations of the memory.

Events similar to frame #2 occur during frames #3 to #7 of multiframe #1 and the contents of all 2-bit storage locations of memory 27 are overwritten with modulo-2 summed parity-bit pairs derived from corresponding channels of frames #1 to #7 of multiframe #1.

When frame #8 arrives, last frame detector 31 causes gate 32 to open to sequentially pass the outputs of modulo-2 adders 24 and 25 to buffer memory 33 as multiframe parity bits P1 to P16 of channels #1 to #16 of multiframe #1, respectively. Buffer memory 33 is controlled by the timing signals applied thereto to forward multiframe parity bits P1 and P2 to multiplexer 10 in which they are respectively inserted to check bit fields 40 and 41 (see FIG. 3) of frame #1 of multiframe #2. Likewise, multiframe parity bits P3 and P4 are respectively multiplexed into check bit fields 40 and 41 of frame #2 of multiframe #2, and parity bits P5 and P6 are respectively multiplexed into check bit fields 40 and 41 of frame #3 of multiframe #2, and so forth, so that multiframe parity bits P1 to P16 are distributed in successive pairs among frames #1 through #8 as shown in FIG. 3.

If the parity counter of FIG. 2 operates as a receive parity counter 16, it receives a multiframe signal of the format of FIG. 3 from frame synchronizer 13. The received multiframe signal is converted to parallel form by serial-to-parallel converter 20 and a parity bit is derived from N data bits of each channel. In a manner identical to that described above, receive parity counter 16 derives multiframe parity bits P1 through P16 from all frames of each multiframe. These internally generated multiframe parity bits are compared by parity comparator 17 with the received multiframe parity bits P1–P16 of the next multiframe from demultiplexer 14. If there is a mismatch, alarm processor 18 generates a request signal for retransmission of the multiframe found to contain an error.

Alternatively, multiframe channel bits can be derived on a per channel basis rather than on a per two-channel basis. In this case, serial-to-parallel converter 22 and latch 23 can be dispensed with and the 3-bit address counter 30 is replaced with a 4-bit address counter to specify each of the 16 storage locations in memory 27.

Figure 4:
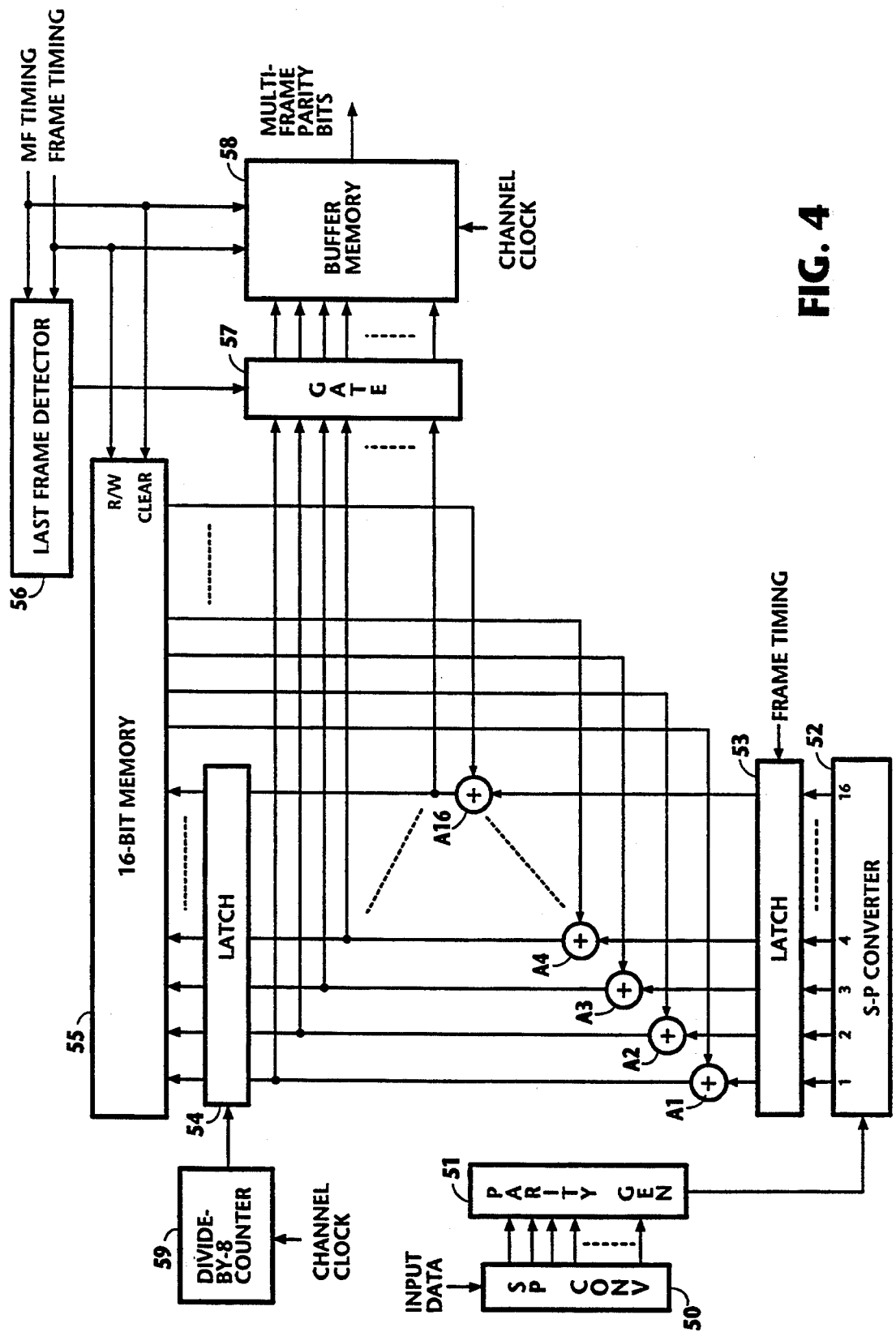
FIG. 4 shows details of a parity counter of an alternative embodiment of the present invention.

A further alternative embodiment of the parity counter is shown in FIG. 4 in which parity bits are derived on a per frame (16-bit) basis. Specifically, a parity bit is derived by parity generator 51 from N parallel data bits stored in serial-to-parallel converter 50 and supplied successively to a (1×16) serial-to-parallel converter 52 so that parity bits derived from all channels of each frame appear at the output of serial-to-parallel converter 51 and then fed into a latch 53. The latched parity bits are applied respectively to modulo-2 adders A1 through A16, whose outputs a reapplied through a second latch 54 to a 16-bit memory 55 which responds to the frame timing signal. All storage locations of memory 55 are in a read mode during a first half period of each frame and in a write mode during the second half period. The outputs of the modulo-2 adders are further coupled through gate 57 to buffer memory 58. Last frame detector 56 supplies a gate-open signal to a gate 57 when it detects the last frame of each multiframe signal. Latch 54 is clocked by a divide-by-8 counter 59 which counts channel clock pulses to generate an output for one-half period of each frame. During the read mode of memory 55 the parity bits stored therein are modulo-2 summed with parity bits stored in latch 53 and stored in latch 54, and during the write mode of memory 55, the contents of latch 54 are written into memory 55.

Memory 55 is cleared at the beginning of each multiframe. It will be seen that 16 channel parity bits derived from frame #1 of multiframe #1 are stored into respective 1-bit locations of memory 55 during the second half period of frame #1, and parity bits subsequently derived from frames #2 to #7 are modulo-2 summed with the stored bits on a per 16-bit, or frame basis during the first half period of the respective frames and stored into memory 55 during the second half period of the respective frames. During the first half period of frame #8, the stored parity bits are modulo-2 summed with parity bits derived from frame #8 and during the second half period of the frame, the modulo-2 summed parity bits are passed through gate 57 to buffer memory 58.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:
1. A transmitter comprising:

parity bit generator means for receiving a multiframe signal comprising a plurality of frames each having a plurality of channels each containing plural data bits, and deriving a parity bit from each of the channels of the received multiframe signal;

memory means for temporarily storing a summed parity bit therein;

modulo-2 adder means for receiving a parity bit from the parity bit generator means and a parity bit from said memory means to produce a summed parity bit, and rewriting the parity bit in said memory means with the summed parity bit;

means for detecting a last frame of said multiframe signal; and multiplexer means for multiplexing a summed parity bit from said modulo-2 adder means with a subsequent multiframe signal in response to the detection of said last frame.

2. A transmitter comprising:

parity bit generator means for receiving a multiframe signal which comprises a plurality of frames each containing N-bit channels and deriving parity bits respectively from the channels of each frame;

memory means for storing a summed parity bit therein;

memory control means for periodically addressing a successive location of said memory means and causing said addressed location to be accessed in a read mode and subsequently in a write mode;

modulo-2 adder means for receiving a parity bit from the parity bit generator means and a parity bit from said memory means to produce a summed parity bit; and said memory means for latching modulo-2 summed parity bits from said modulo-2 adder means during said read mode and supplying the latched modulo-2 summed parity bits to said memory means during said write mode to thereby rewrite the contents of said addressed location;

means for detecting a last frame of said multiframe signal; and multiplexer means for multiplexing a summed parity bit from the modulo-2 adder means with a subsequent multiframe signal in response to the detection of said last frame.

3. A transmitter apparatus comprising:

parity bit generator means for receiving a multiframe signal which comprises a plurality of frames each containing N-bit channels and deriving parity bits respectively from the channels of each frame;

first latch means for latching the parity bits derived by said parity bit generator means from all channels of each frame;

first memory means for storing summed parity bits, said first memory means operating in a read mode and subsequently in a write mode during the period of each frame;

modulo-2 adder means for receiving a parity bit from the parity bit generator means and means and a parity bit from said first memory means to produce a summed parity bit;

second latch means for latching parity bits summed by said modulo-2 adder means during said read mode and supplying the latched modulo-2 summed parity bits to said first memory means during said write mode;

means for detecting a last frame of said multiframe signal in response to the detection of said last frame; and multiplexer means for multiplexing a summed parity bit from said modulo-2 adder means with a subsequent multiframe signal in response to the detection of said last frame.

4. A receiver comprising:
demultiplexer means for receiving a multiframe signal comprising parity bits and a plurality of frames each having a plurality of channels of data bits, said demultiplexer means demultiplexing the parity bits from the data bits;
parity bit generator means for receiving said demultiplexed data bits, and deriving a parity bit from each of the channels;
memory means for temporarily storing a summed parity bit therein;
modulo-2 adder means for receiving a parity bit from the parity bit generator means and a parity bit from said memory means to produce a summed parity bit, and rewriting the parity bit in said memory means with the summed parity bit;
means for detecting a last frame of said multiframe signal; and
comparator means for comparing a summed parity bit from said modulo-2 adder means with each of said demultiplexed parity bits in response to the detection of said last frame to detect a match or a mismatch.

5. A receiver comprising:
demultiplexer means for receiving a multiframes signal comprising parity bits and a plurality of frame each having a plurality of channels of data bits, said demultiplexer means demultiplexing the parity bits from the plurality of channels of said data bits;
parity bit generator means for receiving said demultiplexed data bits, and deriving parity bits respectively from the channels of each frame;
memory means for storing a summed parity bit therein;
memory control means for periodically addressing a successive location of said memory means and causing said addressed location to be accessed in a read mode and subsequently in a write mode;
modulo-2 adder means for receiving a parity bit from the parity bit generator means and a parity bit from said memory means to produce a summed parity bit;
latch means coupled between said modulo-2 adder means and said memory means for latching modulo-2 summed parity bits from said modulo-2 adder means during said read mode and supplying the latched modulo-2 summed bits to said memory means during said write mode to thereby rewrite the contents of said addressed location;
means for detecting a last frame of said multiframe signal; and
comparator means for comparing a summed parity bit from said modulo-2 adder means with each of said demultiplexed parity bits in response to the detection of said last frame to detect a match or a mismatch.

6. A receiver apparatus comprising:
demultiplexer means for receiving a multiframe signal comprising parity bits and a plurality of frames each having a plurality of channels of data bits, said demultiplexer means demultiplexing the parity bits from the plurality of channels of said data bits;
parity bit generator means for receiving said demultiplexed data bits and deriving parity bits respectively from the channels of each frame;
first latch means for latching the parity bits derived by said parity generator means from all channels of each frame;
first memory means for storing summed parity bits, said first memory means operating in a read mode and subsequently in a write mode during the period of each frame;
modulo-2 adder means for receiving a parity bit from the parity bit generator means and a parity bit from said first memory means to produce a summed parity bit;
second latch means for latching parity bits summed by said modulo-2 adder means during said read mode and supplying the latched modulo-2 summed parity bits to said first memory means during said write mode;
means for detecting a last frame of said multiframe signal; and
comparator means for comparing a summed parity bit from said modulo-2 adder means with each of said demultiplexed parity bits in response to the detection of said last frame to detect a match or a mismatch.

7. A communication apparatus comprising:
first parity bit generator means for receiving a transmit multiframe signal comprising a plurality of frames each having a plurality of N-bit channels, and deriving a parity bit from each of the channels of the received multiframe signal;
first memory means for temporarily storing a summed parity bit therein;
first modulo-2 adder means for receiving a parity bit from the first parity bit generator means and a parity bit from said first memory means to produce a summed parity bit, and rewriting the parity bit in said first memory means with the summed parity bit;
means for detecting a last frame of said transmit multiframe signal;
multiplexer means for multiplexing a summed parity bit from said first modulo-2 adder with a subsequent transmit multiframe signal in response to the detection of said last frame to produce a multiplex signal, and transmitting the multiplex signal;
demultiplexer means for receiving a multiframe signal from the multiplexer means, the received signal comprising parity bits and a plurality of frames each having a plurality of channels of data bits, said demultiplexer means demultiplexing the parity bits from the data bits;
second parity bit generator means for receiving said demultiplexed data bits, and deriving a parity bit from each of the channels;
second memory means for temporarily storing a summed parity bit therein;
second modulo-2 adder means for receiving a parity bit from the second parity bit generator means and a parity bit from said second memory means to produce a summed parity bit, and rewriting the parity bit in said second memory means with the summed parity bit;
means for detecting a last frame of said receive multiframe signal; and
comparator means for comparing a summed parity bit from said second modulo-2 adder means with each of said demultiplexed parity bits in response to the detection of said last frame of the received multiframe signal to produce an a alarm signal if a mismatch is detected an applying the alarm signal to said multiplexer means to be multiplexed with said transmit multiframe signal.

* * * * *